Jan. 6, 1959 J. G. GALE 2,867,026
SLING HOOK
Filed Dec. 3, 1956 2 Sheets-Sheet 1

INVENTOR.
James G. Gale.
BY
Fishburn & Gold
ATTORNEYS.

Jan. 6, 1959    J. G. GALE    2,867,026
SLING HOOK
Filed Dec. 3, 1956    2 Sheets-Sheet 2
*Fig. 2.*
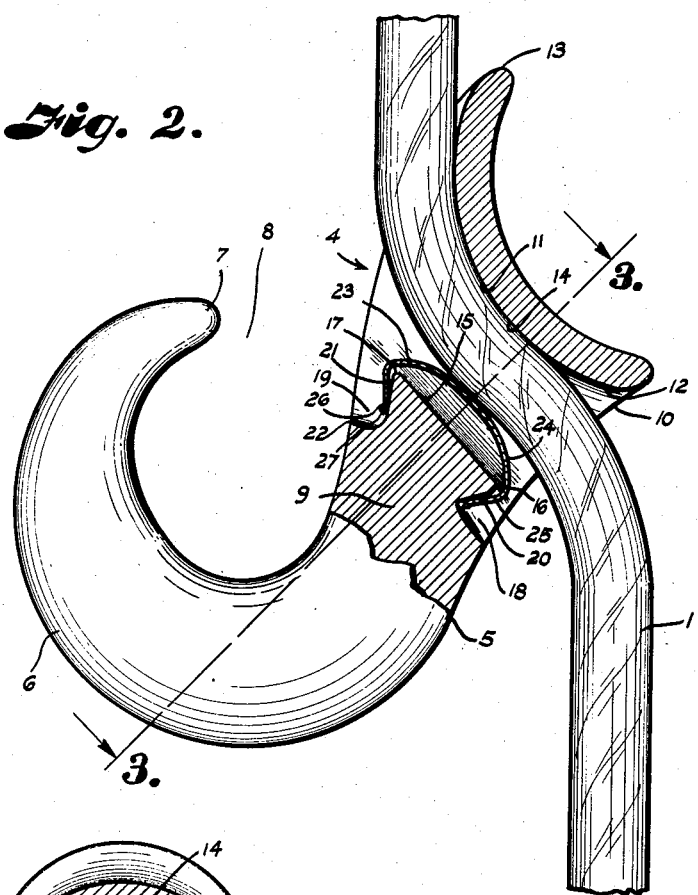
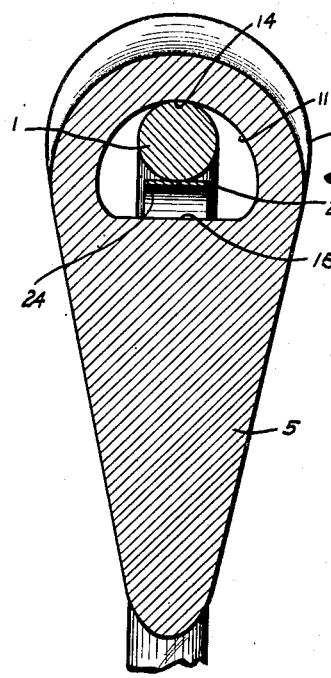
*Fig. 3.*
INVENTOR.
James G. Gale.
BY
Fishburn & Gold
ATTORNEYS.

United States Patent Office 2,867,026
Patented Jan. 6, 1959

2,867,026

SLING HOOK

James G. Gale, Kansas City, Mo., assignor to Newco Manufacturing Company, Inc., Kansas City, Mo., a corporation of Missouri Application December 3, 1956, Serial No. 625,778

2 Claims. (Cl. 24—230.5)

This invention relates to rope fittings and more particularly to a type of fitting commonly referred to as sliding hooks, sling hooks and choker hooks wherein the hook is sleeved on a hauling or lifting rope line and adapted to be engaged with an eye or the like on the free end of the line when passed around a load to form a slip loop connection with said load that is rapidly adjustable to varying sized loads.

Conventional sliding or choker sling hooks have a hook at one end of a body and a passage through the other end to receive a rope or cable whereby the hook is freely slidable on the rope. Such hooks tend to slide down to the end of the rope whereby it is necessary to raise the hook as the line is placed around a load, and in some instances, the hook slides down below the cargo or load during the application of the sling thereto so it is necessary to raise the load in order to release the hook and move same upwardly on the rope into a position to be engaged with the eye at the free end thereof. Efforts to move the hook or hold same in position during application of the sling to a load frequently result in injury to the workers' hands as by being pinched between the rope and load.

The principal objects of the present invention are to provide a sling hook that will eliminate the aforementioned difficulties; to provide an improved sling or choker hook structure which may be positioned on the rope of a sling and which when released will remain in said selected position for ready application to a loop or eye at the free end of the sling; to provide an improved sling hook structure with resilient frictional engagement with the rope threaded through the passage therein wherein the frictional grip will prevent gravitational slippage of the hook on the rope; to provide a sling hook with a frictional rope grip in which the gripping surfaces do not distort said rope; to provide such a sling hook with a resilient frictional member that grips the body of the hook to retain the frictional member in assembled position; and to provide a sling hook that is economical to manufacture, easily assembled, that will hold against gravity sliding on the rope but that will substantially slide when manually moved or placed under load.

In accomplishing these and other objects of the present invention, I have provided improved details of structure, the preferred form of which is illustrated in the accompanying drawings, wherein:

Fig. 2 is a side elevation of the sling hook on a rope with portions broken away to illustrate the resilient frictional grip structure to hold the hook in place on the rope.

Fig. 3 is a transverse sectional view through the sling hook on the line 3—3, Fig. 2.

Figure 1:
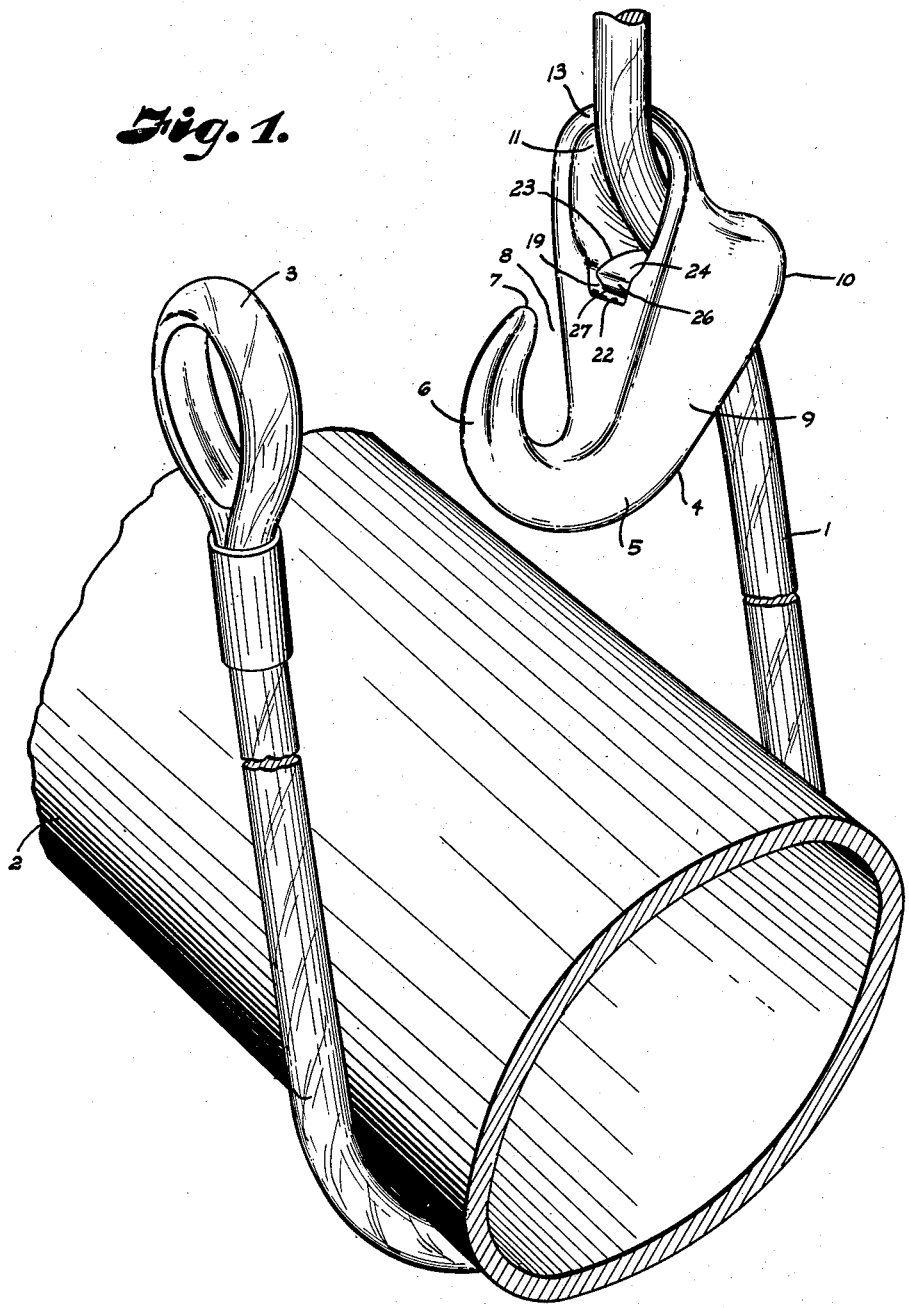
Fig. 1 is a perspective view of a sling hook on a cargo sling extended around a load to be lifted.

Referring more in detail to the drawings:

1 designates a rope or cable having one end (not shown) suitably arranged for connection with a hook or other lifting or hauling device. The rope 1 forms a part of a sling adapted to be disposed in embracing relation to a load 2 such as a pipe or other suitable cargo. The free end of the rope is provided with a loop or eye 3 adapted to be connected with a sling hook 4 embodying the features of the present invention and mounted for sliding movement on the rope 1.

The sling hook structure 4 includes a body member 5 provided at one end with a portion formed in a return bend 6 terminating in a nose 7 spaced from the body 5 as at 8 whereby the reverse bend forms a hook portion 9 that is preferably progressively larger in size from the nose 7 to substantially the opposite or shank end 10 of the body 5. The shank end 10 is widened and thickened and is provided with a through passage 11 whereby said shank end is in the form of a sleeve. The opposite ends 12 and 13 of the passage 11 are flared outwardly and the side 14 of the passage remote from the hook is substantially arcuate in shape and is of suitable length whereby when the rope 1 is engaged therewith the rope is not subjected to excessively sharp bends in lifting a load. The inner side 15 of the passage 11 or side adjacent the hook portion terminates short of the ends of the passage 11 as at 16 and 17 and recesses 18 and 19 extend into the body 5 at the ends of said inner surface 15. The recesses 18 and 19 have surfaces 20 and 21 respectively that slope inwardly and toward the hook portion 9 of the body as illustrated in Fig. 2 whereby the spacing between the bottoms 22 of the recesses is less than the distance between the ends 16 and 17 of the hook or inner side 15 of the passage 11.

The passage 11 is substantially larger in diameter at the center portion thereof than the rope 1 and a resilient frictional gripping member 23 is arranged in the passage to grip the rope between said gripping member and the side 14 of the passage. In the illustrated structure, the gripping member 23 is formed of flat spring metal in an arcuate gripping bar 24 having backwardly or inturned end members 25 and 26 terminating in spaced ends 27 that normally have a spacing substantially less than the length of the side 15 of the passage 11, and the arc of the bar portion 24 is such that when the end members 25 and 26 are engaged in the recesses 18 and 19, the spacing between the bar portion 24 and the side 14 of the passage 11 is less than the diameter of the rope 1. The resiliency of the gripping member is such that the end members 25 and 26 grip the inclined surfaces 20 and 21, and when a rope is threaded through the passage, the frictional gripping member is such that the rope is gripped sufficiently to support approximately twice the weight of the sling hook member to provide a grip on the rope whereby the sling hook may be positioned as desired on said rope, and when left unattended the hook will remain in the selected position; however, the grip is light whereby the hook may be grasped and easily moved to position same and when under load the hook will be automatically pulled down toward the load to tighten the sling thereon.

In assembling a sling hook constructed as described, the frictional grip member 23 is placed in the passage with one end engaged in one of the recesses and the other end pulled over the other end of the side 15 of the passage 11 and moved into the other recess whereby the ends of the gripping member resiliently grip the body portion of the hook in the recesses to positively retain the gripping member in position. In making a sling, an eye or loop 3 is formed thereon at one end and the opposite end is threaded through the passage 11 and then suitably formed to provide a loop or other fitting for connection to the lifting mechanism. When it is desired to lift a load, the sling hook 4 is grasped and slid upwardly on the rope 1 substantially above any portion that will be engaged with the load to be lifted. Then the free end of the rope is placed under the load and moved upwardly on the opposite side and the eye 3 engaged with the hook portion 9. Lifting force then applied to the line 1 will cause the hook to slide downwardly for tightening of the sling on the load after which the load may be moved as desired. When the load is lowered and the rope slackened, the hook may then again be grasped to slide same on the rope to facilitate release of the sling from the load.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A sling hook structure comprising, a body having an enlarged base portion at one end with a passage therethrough adapted to receive a rope threaded therethrough, a hook on the other end of said body, said passage being flared at each end thereof with the side of said passage opposite the hook curved in the same direction as said hook, an elongate resilient gripping member in the passage and extending longitudinal thereof, and inturned ends on the resilient gripping member engaged over the body at opposite ends of one side of the passage to retain said gripping member positioned in said passage, the portion of the resilient gripping member in the passage being crowned toward the opposite side of the passage with the intermediate portion of said gripping member normally spaced from said opposite side of the passage a distance less than the diameter of the rope, whereby a rope extending through the passage is frictionally engaged by the resilient member and said opposite side of the passage and resiliently clamped therebetween to hold the hook structure against free slippage on the rope.

2. A sling hook structure comprising, a body having a return bend at one end defining a hook and an enlarged base portion at the opposite end having a passage therethrough for a rope threaded therethrough, said passage being flared at each end thereof with the side of said passage opposite the hook curved in the same direction as said hook, there being inwardly extending recesses in the body at opposite ends of the side of the passage adjacent the hook, said recesses having bottoms spaced from said passage and with less spacing between said bottoms than the length of the side of the passage adjacent the hook, an elongate flat spring member in the passage and extending longitudinally thereof, backwardly turned ends on the flat spring member extending into said recesses in gripping engagement with the body for retaining said flat spring member in said passage, and an arcuate portion on the flat spring member in the passage and crowned from the ends toward the side of the passage remote from the hook with the intermediate portion of said crowned portion being normally spaced from said remote side of the passage a distance less than the diameter of a rope, whereby the rope extending through the passage is frictionally engaged by the arcuate portion of said spring member and said remote side of the passage and resiliently clamped therebetween and the hook structure will move on the rope only when the rope is pulled through the passage.

References Cited in the file of this patent

UNITED STATES PATENTS

| | | |
|---|---|---|
| 441,848 | Kemp | Dec. 2, 1890 |
| 655,858 | Ettinger | Aug. 14, 1900 |
| 707,241 | Knapp | Aug. 19, 1902 |
| 1,882,167 | Thirlwell | Oct. 11, 1932 |
| 2,499,077 | Roysher | Feb. 28, 1950 |
| 2,541,855 | Bauer | Feb. 13, 1955 |